United States Patent
Deshpande et al.

(10) Patent No.: US 7,774,528 B2
(45) Date of Patent: Aug. 10, 2010

(54) DEVICE IDENTIFICATION CODING OF INTER-INTEGRATED CIRCUIT SLAVE DEVICES

(75) Inventors: Amrita Deshpande, Chandler, AZ (US); Alma Anderson, Chandler, AZ (US); Jean-Marc Irazabal, Santa Clara, CA (US); Stephen Blozis, Morgan Hill, CA (US); Paul Boogaards, Cary, NC (US)

(73) Assignee: NXP B.V., Eindhoven (NL)

( * ) Notice: Subject to any disclaimer, the term of this patent is extended or adjusted under 35 U.S.C. 154(b) by 66 days.

(21) Appl. No.: 11/913,064

(22) PCT Filed: May 1, 2006

(86) PCT No.: PCT/IB2006/051363
§ 371 (c)(1),
(2), (4) Date: Oct. 30, 2007

(87) PCT Pub. No.: WO2006/117750
PCT Pub. Date: Nov. 9, 2006

(65) Prior Publication Data
US 2008/0201511 A1    Aug. 21, 2008

Related U.S. Application Data

(60) Provisional application No. 60/676,104, filed on Apr. 29, 2005.

(51) Int. Cl.
G06F 13/42    (2006.01)
G06F 13/00    (2006.01)
G06F 3/00    (2006.01)

(52) U.S. Cl. .............. 710/106; 710/3; 710/16; 710/110

(58) Field of Classification Search ........... 710/3–5, 710/15–16, 19, 105–106, 110
See application file for complete search history.

(56) References Cited

U.S. PATENT DOCUMENTS

| | | | | |
|---|---|---|---|---|
| 6,031,743 | A | * | 2/2000 | Carpenter et al. .............. 363/65 |
| 6,044,423 | A | * | 3/2000 | Seo et al. ..................... 710/302 |
| 6,799,233 | B1 | * | 9/2004 | Deshpande et al. ......... 710/110 |
| 2002/0016897 | A1 | * | 2/2002 | Nerl .......................... 711/170 |

(Continued)

OTHER PUBLICATIONS

"The I2C-Bus Specification". Version 2.1. Jan. 2000. Phillips Semiconductors. Document Order No. 9398 393 40011.*

(Continued)

*Primary Examiner*—Thomas J Cleary

(57) ABSTRACT

Consistent with one example embodiment, communications systems, using a serial data transfer bus having a serial data line and a clock line used to implement a communications protocol, incorporate identification of inter-integrated circuit slave devices using device identification coding. The communications system includes a slave device having a device identification code identifying one or more parameters. Communications circuitry in the slave device is configured to communicate with a master device on the I2C serial data transfer bus using the communications protocol. In response to a transmission of a device identification address from the master device, the slave device is configured to transmit an ACKNOWLEDGE, and in response to a transmission of a slave device address and the device identification address from the master device, the slave device is configured to transmit the device identification code from the slave device to the master.

20 Claims, 4 Drawing Sheets

U.S. PATENT DOCUMENTS

| | | | |
|---|---|---|---|
| 2002/0194468 A1* | 12/2002 | Betts-LaCroix et al. | 713/100 |
| 2003/0234625 A1* | 12/2003 | Frankel et al. | 318/268 |
| 2004/0019720 A1* | 1/2004 | Trembley | 710/110 |
| 2005/0015533 A1 | 1/2005 | Naura et al. | |
| 2005/0040779 A1 | 2/2005 | Frankel et al. | |
| 2005/0066218 A1 | 3/2005 | Stachura et al. | |
| 2005/0073608 A1 | 4/2005 | Stone et al. | |

OTHER PUBLICATIONS

"System Management Bus (SMBus) Specification". Version 2.0. Aug. 3, 2000. SBS Implementers Forum.*

"PCA9534 8-bit I2C and SMBus, low power I/O port with interrupt". Data Sheet. Dec. 2, 2003. Philips Semiconductors.*

Deshpande, Amrita "Design of a Behavioral (Register Transfer Level, RTL) Model of the Inter-Integrated Circuit or I2C-Bus Master-Slave Interface" Master'S Thesis of Amrita Deshpande, University of New Mexico, 1999.

International Preliminary Report on Patentability for Int'l Patent Appln. PCT/IB2006/051363 (Oct. 30, 2007).

* cited by examiner

DEVICE IDENTIFICATION CODING OF INTER-INTEGRATED CIRCUIT SLAVE DEVICES

The present invention is directed generally to communication devices and methodologies, and more particularly, to methods and arrangements for identifying inter-integrated circuit slave devices using device identification coding.

The Inter-Integrated Circuit (I2C) bus developed by Philips Corporation allows integrated circuits to communicate directly with each other via a simple bi-directional 2-wire bus (plus power and ground). A device connects to each of the two wires on the bus, one serial data line (SDA) for the communication of data, and the other serial clock line (SCL) for the control and synchronization of the communication of data between the devices. Each device is connected in parallel to each of the other devices, and each of the bus lines, SDA and SCL, function as a wired-AND of all the lines on the bus. The output of each device is configured as an open-collector/open-drain device, and one or more pull-up resistors maintain a 'soft' logic high value on the bus while the bus is in the quiescent state. When a device desires access to the bus, the device pulls the bus to a logic low value, via the open-collector/open-drain device that is placed in a conductive state to ground potential.

Each device that is connected to an I2C bus is identifiable by an address, and can operate as either a transmitter or a receiver, or both. Data transfers are effected using a master-slave communications protocol. A master is a device that initiates a data transfer and generates the clock signals to permit the transfer; any device that is addressed is considered a slave for this transfer. The data transfer can be initiated by a master to either transmit data to the slave (herein designated as write), or to request data from the slave (herein designated as read). For example, an output device, such as a display screen, is typically not able to initiate a data transfer, and therefore would be configured to only operate as a slave device. A microprocessor, on the other hand, will typically be configured to operate as either a master or a slave, as the situation demands.

In a quiescent state, both the SDA and SCL bus lines are in the logic-high state (herein designated as high, or logic state of 1). A master initiates a data transfer by asserting a transition to a logic-low state (herein designated as low, or logic state of 0) on the SDA line while the SCL line is high; this is termed a START condition. Thereafter, the master toggles the SCL line to control the synchronization of the data transfer; data value changes occur on the SDA line when the SCL clock is low, and the state of the SDA line is considered valid only when the SCL clock is high.

Multiple STARTs can be asserted to effect a series of data transfers within the same transfer session. Generally, each data transfer requires an acknowledgement from the addressed recipient of the data transfer. To terminate the data transfer, the host asserts a low-to-high transition on the SDA line while the SCL clock is high; this is termed a STOP condition. Thereafter, any device may assume control of the bus as a master by asserting a high-to-low transition on the SDA line, as above. Note that, for ease of reference, the term assert is used herein for effecting, or attempting to effect, the specified logic state. In the example of a transition to a logic-high state, this is typically provided by a release of the bus from a forced pull-down state by the asserting device. This assertion of a logic-high state allows the aforementioned pull-up devices on the bus to bring the bus to a logic-high state, unless another device is also forcing the pull-down state.

The general format of an I2C data transfer involves signals on an SDA line and an SCL line forming the I2C bus. A START condition (S) corresponds to high-to-low transition of the signal on the SDA line while the SCL line is high. After the START, the host transmits an address, nominally seven bits, followed by a read/write-not indicator. After transmitting the address and the direction of data transfer (R/W-), the host releases the SDA line, allowing it to rise to a logic-high level. If a slave device recognizes its address, the slave device transmits an acknowledge signal (ACK) by pulling the bus low. The absence of a low signal when the host releases the SDA line, therefore, indicates a non-acknowledgement (NAK). If the address is acknowledged, via a low at SDA, the transmitting device transmits the data. If the direction of data transfer is a "read" relative to the host, then the slave device is the transmitting device; if the direction is a "write" relative to the host, then the master device is the transmitting device. The transmitting device releases control of the SDA line, and the receiving device acknowledges the receipt of the data by asserting a logic-low value on the SDA line. If the data is acknowledged, the transmitter sends additional data. This process continues until the entirety of the data is communicated, or until a transmitted data item is not-acknowledged. The master can subsequently reassert a START signal, and repeat the process above, or, can assert a STOP signal (P) to terminate this data-transfer session.

The above interface protocol can be implemented in a variety of ways. To minimize the development time for programming or designing an I2C interface, a variety of general-purpose interface schemes have been published. "Design of a Behavioral (Register Transfer Level, RTL) Model of the Inter-Integrated Circuit or I2C-Bus Master-Slave Interface", Master's Thesis of Amrita Deshpande, University of New Mexico, 1999, discloses an I2C master interface and slave interface that is intended to be embodied in an I2C device, and is incorporated by reference herein. By providing a verified I2C interface, system designers need not address the details of the I2C specification and protocol. Both the master and the slave interfaces of this thesis are state-machine based. State-machine based systems and methods are further described in U.S. Pat. No. 6,799,233, which is hereby incorporated herein by reference.

Various aspects of the present invention are directed to methods and arrangements for identifying inter-integrated circuit slave devices using device identification coding in a manner that addresses and overcomes the above-mentioned issues.

Consistent with one example embodiment, communications systems, using a serial data transfer bus having a serial data line and a clock line used to implement a communications protocol, incorporate identification of inter-integrated circuit slave devices using device identification coding. The communications system includes a slave device having a device identification code identifying one or more parameters. Communications circuitry in the slave device is configured to communicate with a master device on the I2C serial data transfer bus using the communications protocol. In response to a transmission of a device identification address from the master device, the slave device is configured to transmit an ACKNOWLEDGE, and in response to a transmission of a slave device address and the device identification address from the master device, the slave device is configured to transmit the device identification code from the slave device to the master.

Consistent with one example embodiment, the present invention is directed to a method involving transmitting, from the master device, a device identification address on the I2C serial data transfer bus. An ACKNOWLEDGE is received by the master device from one or more slave devices. A slave device address is transmitted from the master device on the I2C serial data transfer bus identifying a particular slave device. The master device re-transmits the device identification address on the I2C serial data transfer bus, and receives an identification code from the particular slave device. The master device identifies one or more parameters of the particular slave device using the identification code.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

The invention may be more completely understood in consideration of the following detailed description of various embodiments of the invention in connection with the accompanying drawings, in which.

Figure 1:
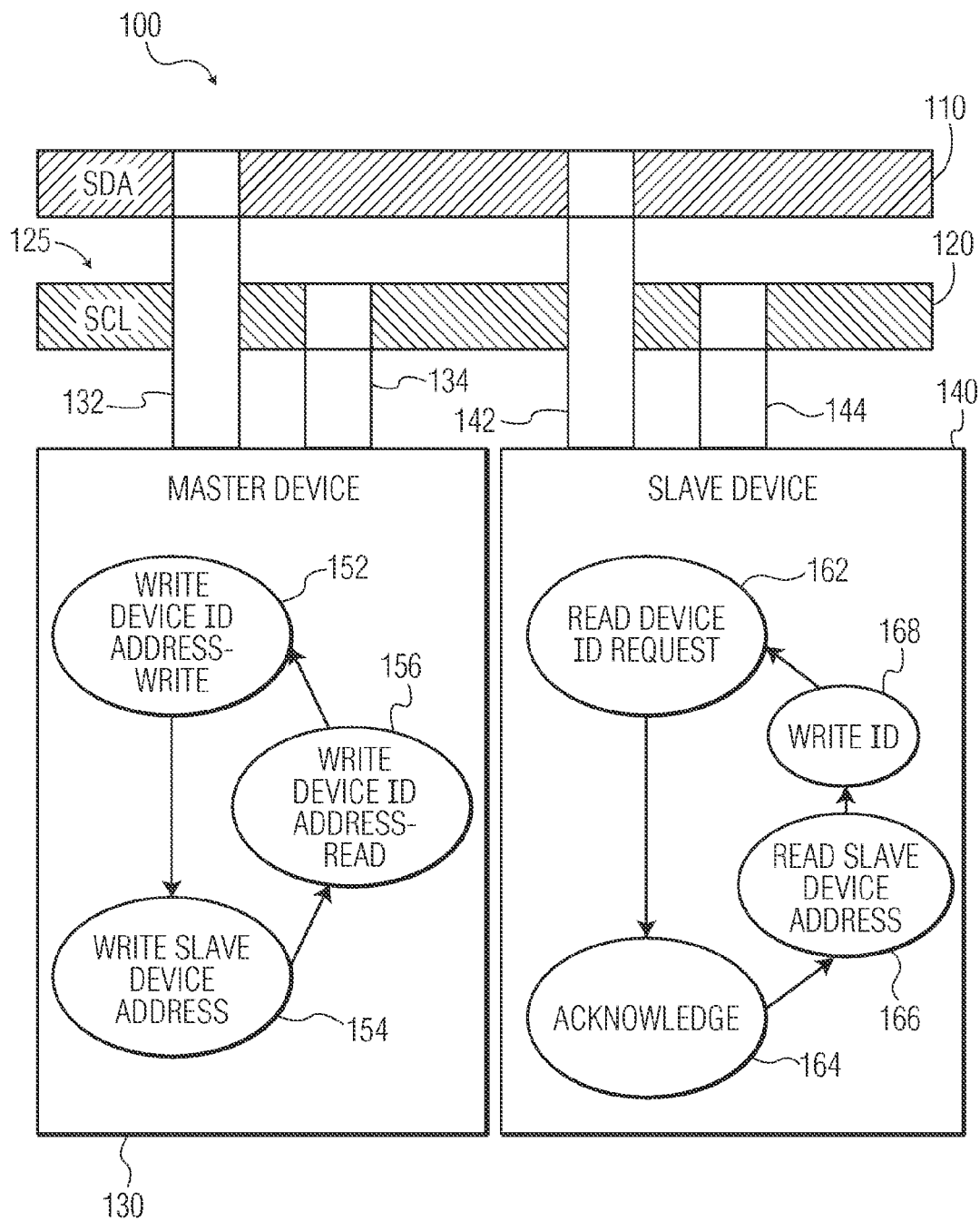
FIG. 1 is a block diagram of a data communications system implementing inter-integrated circuit slave device identification coding in accordance with embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is generally applicable to methods and arrangements for identifying inter-integrated circuit slave devices using device identification coding. The invention has been found to be particularly advantageous for Inter Integrated Circuit (I2C) serial data communications busses, but is also advantageous for other busses and communications protocols, such as system management bus (SMBus) architectures and/or protocols or other serial data communications systems. For purposes of illustration, and not of limitation, the invention will be described in the context of an I2C bus having a master device controlling communication to a slave device.

Masters control the communication with I2C slaves on the I2C bus architecture. I2C slaves find numerous applications in fields ranging from cell phones, PDAs and SmartPhones to LCD TVs, Medical Equipment, Gaming, and other applications. One particular application of an I2C slave is as a General Purpose Input/Output (GPIO) device. In this type of device, there are a number of multi-function pins that can be used as inputs or outputs. When used as inputs, these pins typically indicate the state of certain signals that are being monitored. When configured as outputs, these devices can be used, for example, to drive light emitting diodes (LEDs). These outputs are typically divided into banks and programmed via the I2C bus.

Consistent with one example embodiment, communications systems, using a serial data transfer bus having a serial data line and a clock line used to implement a communications protocol, incorporate identification of inter-integrated circuit slave devices using device identification coding. The communications system includes a slave device having a device identification code identifying one or more parameters. Communications circuitry in the slave device is configured to communicate with a master device on the I2C serial data transfer bus using the communications protocol. In response to a transmission of a device identification address from the master device, the slave device is configured to transmit an ACKNOWLEDGE, and in response to a transmission of the particular slave device's address and the device identification address from the master device, the slave device is configured to transmit the device identification code from the slave device to the master.

There are a number of manufacturers in the industry making I2C slave devices for various applications. In a system, therefore, it is possible to have different kinds of I2C devices, manufactured by different manufacturers. Device ID in accordance with the present invention is a way to identify, through software, parameters such as the manufacturer, device type and the revision of the device.

A protocol for device identification in accordance with the present invention provides a simple and a uniform way for all the slave devices to respond with their unique device IDs. In one example embodiment, the Device ID is a three byte (24 bits) read-only word giving the following information: 12 bits with the manufacturer name, unique per manufacturer (e.g. Philips); 9 bits with part identification, assigned by manufacturer (e.g. PCA9698); and 3 bits with the die Revision number assigned by the manufacturer (e.g. Rev. X)

In this example, the Device ID is read-only, hard-wired in the device, and can be accessed as follows:

1. The master sends a START command on the I²C bus.
2. The master sends the Device ID Address, "1111100" with the Read/Write# bit set to 0 (Write).
3. The master then sends the I2C slave address of the of the slave device it needs to identify. The LSB is a don't-care value. Only one device must acknowledge this byte (the one that has the I2C slave address).
4. The master sends a Re-START command.
5. The master sends the Device ID Address, "1111100" with the Read/Write# bit set to 1 (Read).
6. The Device ID Read can be done, starting with the 12 manufacturer bits, (first byte+4 bits of the next byte) followed by the 9 part identification bits (4 LSBs of the second byte+5 MSBs of the third byte), and then the 3 die revision bits (3 LSB of the third byte).
7. The master ends the Read sequence by NACKing, (NO-ACKNOWLEDGing) the last byte.

NOTE1: The reading of the Device ID can be stopped any time by sending a NO-ACKNOWLEDGE any byte.

NOTE2: If the master continues to ACKNOWLEDGE the bytes after the third byte, the device rolls back to the 1st byte and keeps sending the Device ID until it receives a NO-ACKNOWLEDGE.

Inter-integrated circuit slave devices using device identification coding on a serial bus may be configured as general purpose Input/Output (GPIO) devices, or other slave devices. The communication system may conform to I2C, SMBus, and/or other serial communication specifications.

FIG. 1 is a block diagram of a data communications system 100 for identifying inter-integrated circuit slave devices using device identification coding in accordance with embodiments of the present invention. An SDA line 110 and an SCL line 120 are arranged as an I2C data bus 125. A master device 130 and a slave device 140 are attached to the I2C data bus 125. The master device 130 is electrically connected to the I2C data bus 125 using an clock connection 134 and a data connection 132 electrically connected to the SCL line 120 and the SDA line 110 respectively.

The slave device 140 is electrically connected to the I2C data bus 125 using an clock connection 144 and a data connection 142 electrically connected to the SCL line 120 and the SDA line 110 respectively. The master device 130 writes 152 the device ID address on the I2C bus, followed by writing 154 a slave device 140 address which the master device 130 wishes to identify. If the master device 130 receives an ACKNOWLEDGE, the master device 130 writes 156 the device ID address again.

The slave device 140 reads the initial device ID from the write 152, and sends an ACKNOWLEDGE 164. The slave device 140 then reads its slave device address from the write 154. In response to reading 166 its slave address, the slave device 140 writes 168 its device ID code on the I2C data bus 125.

Figure 2:
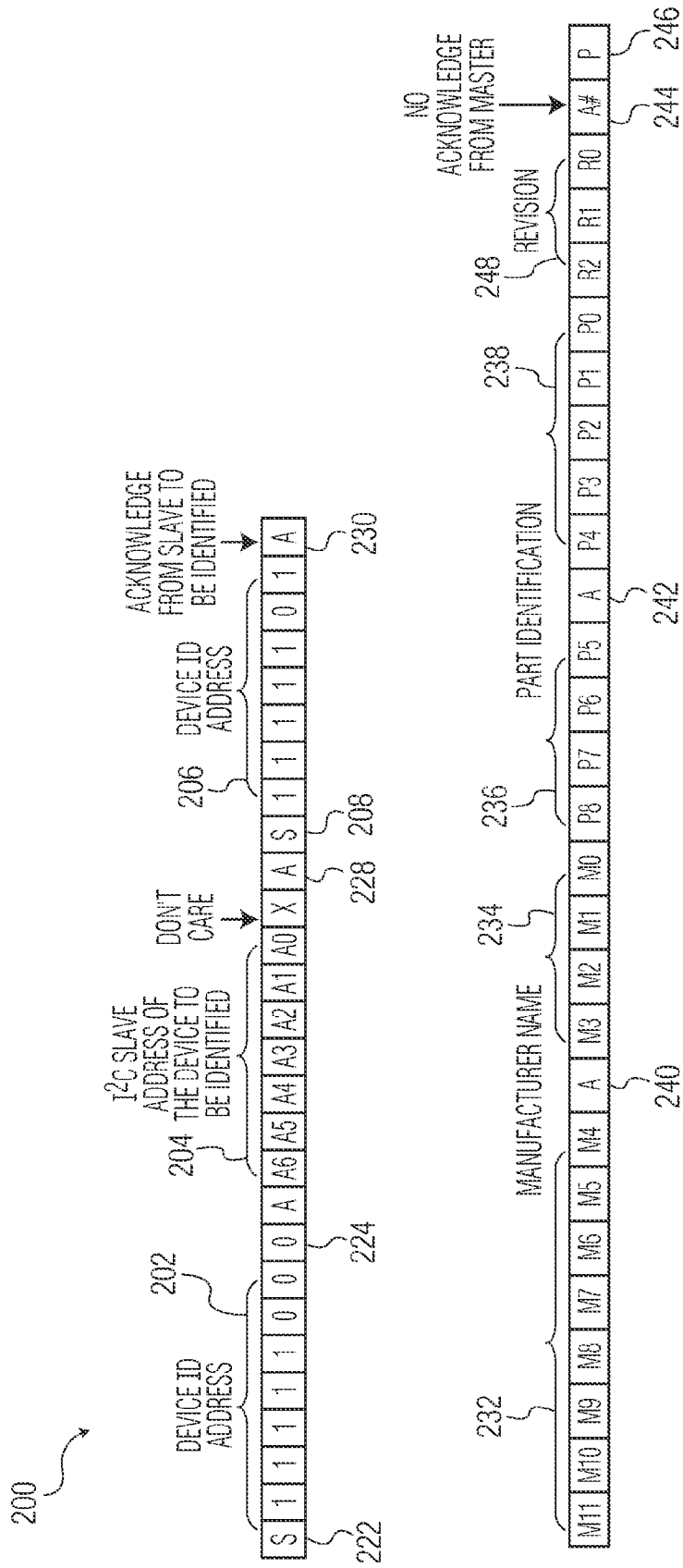
FIG. 2 is an illustration of a data stream for a data communications system implementing inter-integrated circuit slave device identification coding in accordance with embodiments of the present invention.

FIG. 2 is an illustration of a serial data stream 200 for a data communications system implementing device identification coding in accordance with embodiments of the present invention. The serial data stream 200 is illustrated in FIG. 2 consistent with an I2C communications protocol. A device ID address 202 follows a START condition 222 transmitted by a master on an I2C bus. All slave devices that recognize the device ID address 202 write an ACKNOWLEDGE 224. A slave address 204 of the slave device that the master wants to identify is then written, followed by a subsequent ACKNOWLEDGE signal 228 from the slave device. The master then re-STARTS 208 and resends the device ID address 206, which is ACKNOWLEDGEd 230 by the slave device.

The slave device then sends its device ID code. For example the device ID code may contain bits identifying a manufacturer name, coded into bits M11 through M4 in data word 232 and bits M3 through M0 in a portion 234 of the next data word. According to the I2C communications protocol, the master device ACKNOWLEDGEs 240 after receiving bit M4 of the data word 232. A part identification may be encoded in portion 236 of the second data word, including bits P8 through P5, and a portion 238 including bits P4 through P0. Again, according to the I2C communications protocol, the master device ACKNOWLEDGEs 242 after receiving bit P5 of the portion 236. Finally, a portion 248 may contain revision information encoded in bits R2 through R0. A NACK 244 follows transmission of the third word, after which the master device writes a STOP 246.

Figure 3:
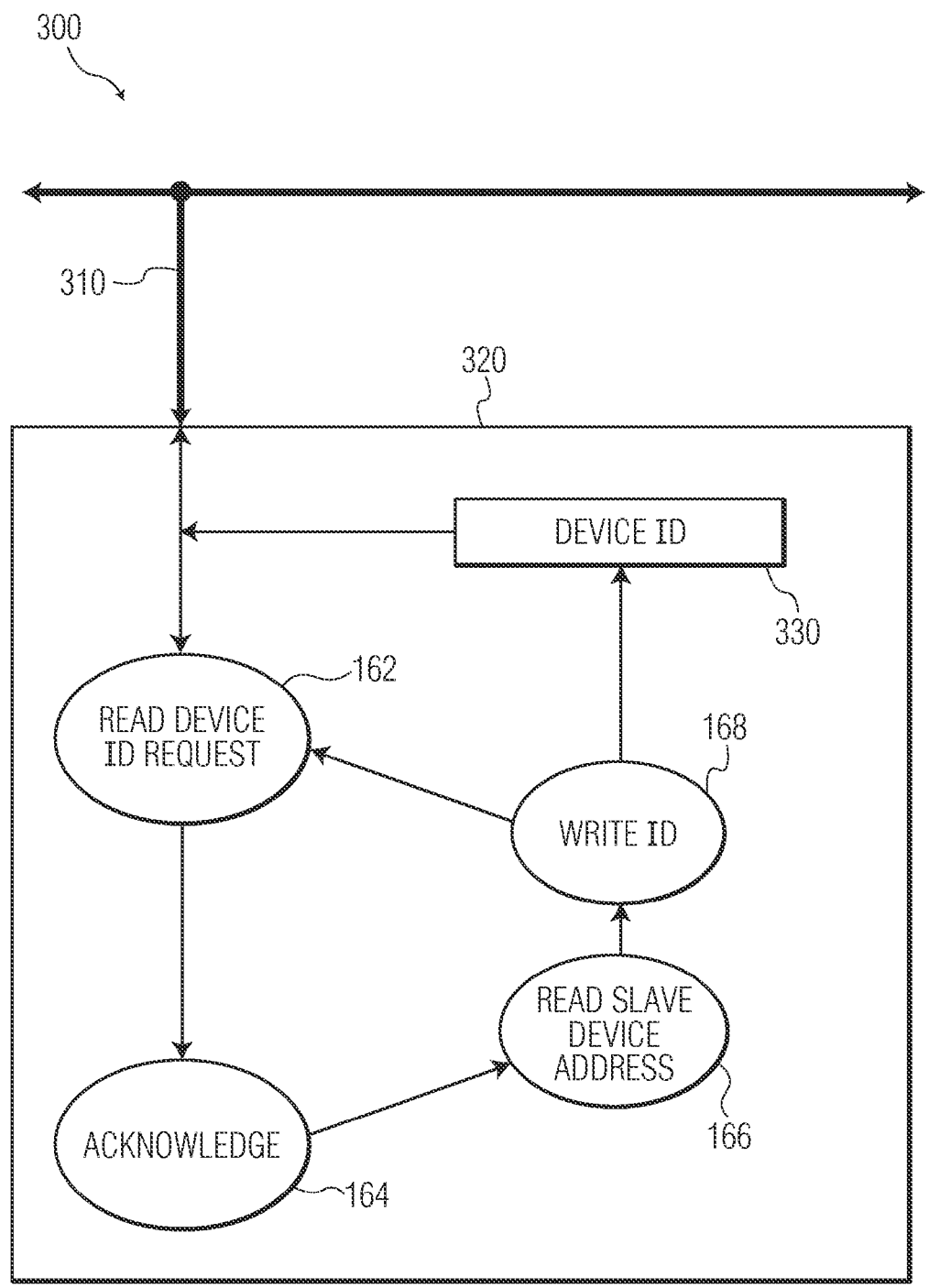
FIG. 3 is a block diagram of a system implementing for identifying inter-integrated circuit slave devices using device identification coding in accordance with embodiments of the present invention.

FIG. 3 is a block diagram of a system 300 implementing identification of inter-integrated circuit slave devices using device identification coding in accordance with embodiments of the present invention. A slave device 320 is connected to an I2C bus 310. The slave device 320 is illustrated in FIG. 3 as a GPIO device. The slave device 320 includes a device ID 330, such as a code written in a non-volatile memory, hardwired into the slave device 320, or programmed into a register, for example. The slave device is configured to implement device identification, such as by implementing the steps 162, 164, 166 and 168 described above with reference to FIG. 1.

Figure 4:
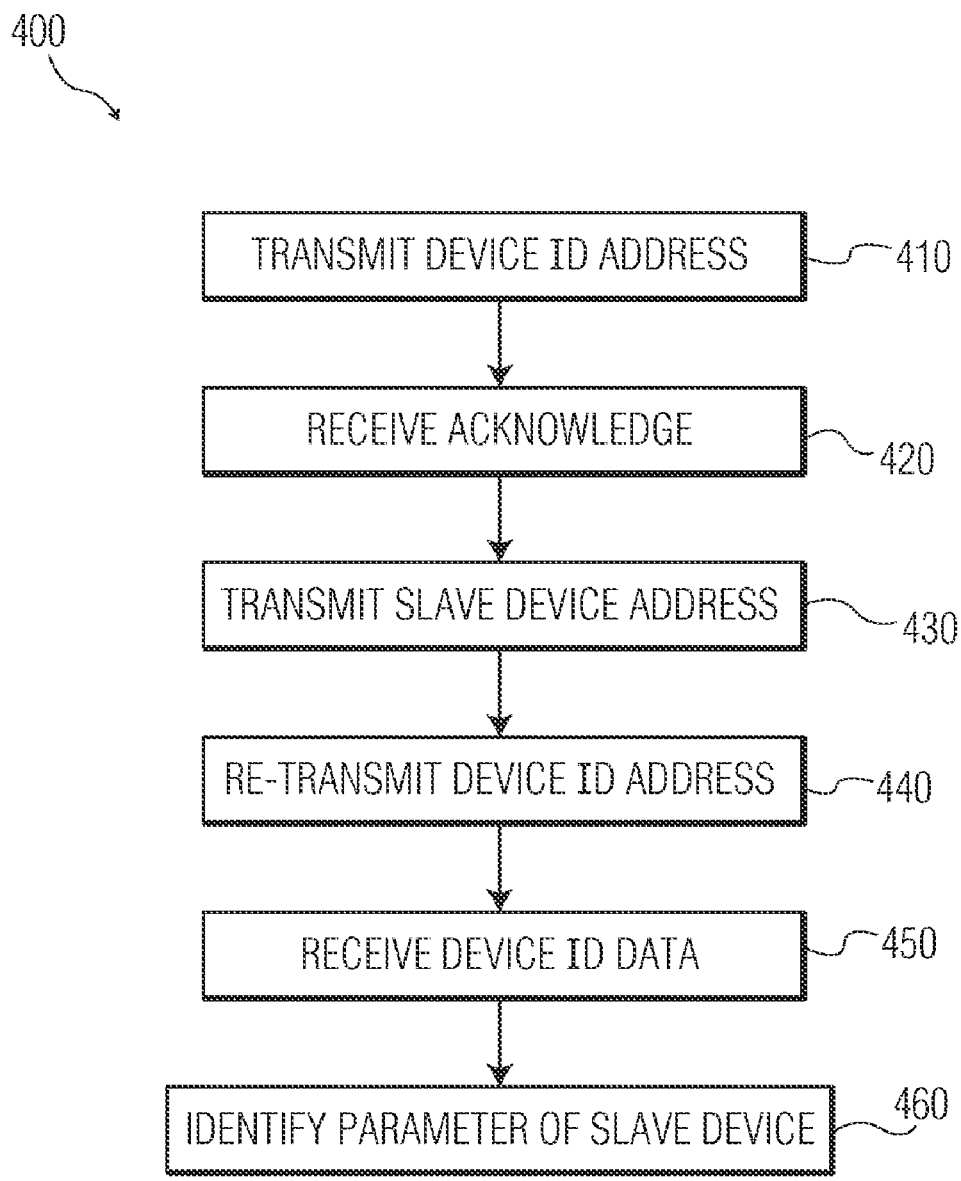
FIG. 4 is a flow chart of a method for identifying inter-integrated circuit slave devices using device identification coding in accordance with embodiments of the present invention.

FIG. 4 is a flow chart of a method 400 for identifying inter-integrated circuit slave devices using device identification coding in accordance with embodiments of the present invention. The method 400 involves a number of slave device, such as a GPIO devices, coupled to an I2C serial data bus, to individually identify themselves to a master device on the bus. A master device transmits 410 the device ID address on the I2C bus. All slave devices that are configured to identify themselves ACKNOWLEDGE 420 the device ID address. The master then transmits a specific slave device address 430, which identifies the specific slave device. The master then re-transmits 440 the device ID address, with a READ in the least significant bit. The identified slave then transmits its device ID code, such as, for example, a three byte code, which the master device receives 450, in accordance with the I2C serial data transmission protocol. The master then identifies one or more parameters 460 of the slave device based on the ID received 450. Parameters may include, but are not limited to, manufacturer, model, serial number, batch number, hardware version, software version, date of manufacture, or other desirable parameter. The use of a GPIO device as the slave device implementing the method 400 is for purposes of illustration only, and not for limitation.

Hardware, firmware, software or a combination thereof may be used to perform the various embodiments for identifying inter-integrated circuit slave devices using device identification coding as described herein. The master device functionality used in connection with the invention may reside in an I2C master device as described, or may alternatively reside on a stand-alone or networked computer attached to the serial data communications system 100. The serial data communications system 100 illustrated in FIG. 1 is an example structure that can be used in connection with such communications systems, computers, or other computer-implemented devices to carry out operations of the present invention.

The example master device 130 and/or slave device 140 illustrated in FIG. 1, suitable for performing embodiments of the present invention, typically include a central processor (CPU) coupled to random access memory (RAM) and/or some variation of read-only memory (ROM). The ROM may also be other types of storage media to store programs, such as programmable ROM (PROM), erasable PROM (EPROM), etc. The processor may communicate with other internal and external components through input/output (I/O) circuitry and/or other bussing, to provide control signals, communication signals, and the like.

The master device 130 and/or slave device 140 may also include one or more data storage devices, including hard and floppy disk drives, CD-ROM drives, and other hardware capable of reading and/or storing information, such as DVD, etc. In one embodiment, software for identifying inter-integrated circuit slave devices using device identification coding may be stored and distributed on a CD-ROM, diskette, or other form of media capable of portably storing information. These storage media may be inserted into, and read by, devices such as a CD-ROM drive, the disk drive, etc. The software may also be transmitted to the computing arrangement via data signals, such as being downloaded electronically via a network, such as the Internet. Further, as previously described, the software for carrying out the functions associated with the present invention may alternatively be stored in internal memory/storage of the computing device, such as in the ROM.

Any resulting program(s), having computer-readable program code, may be embodied within one or more computer-usable media such as memory devices or transmitting devices, thereby making a computer program product or article of manufacture according to the invention. As such, the terms "computer readable medium," "article of manufacture," "computer program product" or other similar language as used herein are intended to encompass a computer program which exists permanently, temporarily, or transitorily on any computer-usable medium such as on any memory device or in any transmitting device.

Each feature disclosed in this specification (including any accompanying claims, abstract, and drawings), is replaceable by alternative features having the same, equivalent or similar purpose, unless expressly stated otherwise. Thus, unless expressly stated otherwise, each feature disclosed is one example only of a generic series of equivalent or similar features.

The present invention should not be considered limited to the particular examples described above. Various modifications, equivalent processes, as well as numerous structures to which the present invention may be applicable fall within the scope of the present invention. For example, embodiments for identifying inter-integrated circuit slave devices using device identification coding in accordance with the present invention can be implemented using a similarly constructed one-way or two-way interface for communication between devices on a common bus, such as an SMBus or other bus arrangement. Such variations may be considered as part of the claimed invention, as fairly set forth in the appended claims.

What is claimed is:

1. In a communications system using an I2C serial data transfer bus that has a serial data line and a clock line used to implement a communications protocol, a method for a master device to identify slave devices coupled to the bus, the method comprising:
    transmitting, from the master device, a device identification address on the I2C serial data transfer bus;
    receiving, by the master device, an ACKNOWLEDGE from one or more slave devices, the one or more slave devices having slave addresses that do not correspond to the device identification address;
    transmitting, from the master device, a slave device address on the I2C serial data transfer bus identifying a particular slave device;
    re-transmitting, from the master device, the device identification address on the I2C serial data transfer bus;
    receiving, by the master device, an identification code from the particular slave device; and
    identifying one or more parameters of the particular slave device using the identification code.

2. The method of claim 1, wherein identifying one or more parameters of the slave device comprises receiving, by the master device, a manufacturer code from the slave device.

3. The method of claim 1, wherein identifying one or more parameters of the slave device comprises receiving, by the master device, a part identification code the slave device.

4. The method of claim 1, wherein identifying one or more parameters of the slave device comprises receiving, by the master device, a revision code from the slave device.

5. The method of claim 1, wherein identifying one or more parameters of the slave device comprises receiving, by the master device, a 24-bit code identifying the manufacturer name, part identification, and revision of the slave device from the slave device.

6. The method of claim 1, wherein the I2C serial data transfer bus further conforms to an SMBus serial communication specification.

7. In a communications system using an I2C serial data transfer bus that has a serial data line and a clock line used to implement a communications protocol, a slave device, comprising:
    circuitry storing a device identification code identifying one or more parameters of the slave device and a slave device address; and
    communications circuitry, configured to communicate with a master device on the I2C serial data transfer bus using the communications protocol;
    wherein, in response to a transmission of a device identification address from the master device, the device identification address not corresponding to the slave device address, the slave device is configured to transmit an ACKNOWLEDGE, and in response to a transmission of a slave device address and the device identification address from the master device, the slave device is configured to transmit the device identification code from the slave device to the master.

8. The device of claim 7, wherein the device identification code comprises a manufacturer code.

9. The device of claim 7, wherein the device identification code comprises a part identification code.

10. The device of claim 7, wherein the device identification code comprises a revision code.

11. The device of claim 7, wherein the device identification code comprises a 24-bit code identifying the manufacturer name, part identification, and revision of the slave device.

12. The device of claim 7, wherein the slave device is configured as a general purpose Input/Output device.

13. The device of claim 7, wherein the slave device is configured to conform to an SMBus serial communication protocol.

14. A computer-readable medium having computer-executable instructions stored therein, the computer-executable instructions, when executed by a computer, causing the computer to perform operations for a master device to identify a slave device, the operations including:
    transmitting, from the master device, a device identification address on an I2C serial data transfer bus using a communications protocol, the device identification address corresponding to an address reserved from use as a slave address;
    receiving, by the master device, an ACKNOWLEDGE from one or more slave devices using the communications protocol;
    transmitting, from the master device, a slave device address on the I2C serial data transfer bus identifying a particular slave device;
    re-transmitting, from the master device, the device identification address on the I2C serial data transfer bus;
    receiving, by the master device, an identification code from the particular slave device; and
    identifying one or more parameters of the particular slave device using the identification code.

15. The computer-readable medium of claim 14, wherein the communications protocol conforms to an SMBus serial communication protocol.

16. An I2C master device, comprising:
    means for transmitting, from the master device, a device identification address on an I2C serial data transfer bus using a communications protocol, the device identification address corresponding to an address reserved from use as a slave address;
    means for receiving, by the master device, an ACKNOWLEDGE from one or more slave devices using the communications protocol;
    means for transmitting, from the master device, a slave device address on the I2C serial data transfer bus identifying a particular slave device;

means for re-transmitting, from the master device, the device identification address on the I2C serial data transfer bus;

means for receiving, by the master device, an identification code from the particular slave device; and means for identifying one or more parameters of the particular slave device using the identification code.

17. The I2C master device of claim 16, wherein the one or more parameters comprises a manufacturer code.

18. The I2C master device of claim 16, wherein the one or more parameters comprises a part identification code.

19. The I2C master device of claim 16, wherein the one or more parameters comprises a revision code.

20. The I2C master device of claim 16, wherein the one or more parameters comprises a 24-bit code identifying the manufacturer name, part identification, and revision of the slave device from the slave device.

* * * * *